United States Patent [19]
Hogg

[11] 3,818,968
[45] June 25, 1974

[54] APPARATUS FOR USE IN MOUNTING TIRES ON AND REMOVING TIRES FROM WHEEL RIMS

[75] Inventor: Derek Hogg, Sutton Coldfield, England

[73] Assignee: Dunlop Limited, London, England

[22] Filed: May 8, 1972

[21] Appl. No.: 251,083

[30] Foreign Application Priority Data
May 12, 1971 Great Britain................. 14606/71

[52] U.S. Cl............................. 157/1.24, 144/288 A
[51] Int. Cl............................................. B25c 25/06
[58] Field of Search .......... 157/1.1, 1.17, 1.22, 1.24

[56] References Cited
UNITED STATES PATENTS

| | | | |
|---|---|---|---|
| 3,238,989 | 3/1966 | Silvestrani......................... | 157/1.24 |
| 3,528,475 | 9/1970 | Duquesne ......................... | 157/1.24 |
| 3,557,861 | 1/1971 | Duquesne ......................... | 157/1.24 |

Primary Examiner—Al Lawrence Smith
Assistant Examiner—Harold P. Smith, Jr.
Attorney, Agent, or Firm—Stevens, Davis, Miller & Mosher

[57] ABSTRACT

An apparatus for mounting and removing tires from wheel rims having at least three arms with means to engage the wheel rim for holding it. Each of the arms has one end pivotally secured to a circular plate and the center portion of each arm is slidably and pivotally mounted to another circular plate so that the free ends of the arms are radially movable when one plate is rotated in relation to the other. Braking means continuously engage one of the plates to insure relative rotation between the plates. The braking means move in a radial direction so that the braking surfaces will be self-cleaning.

5 Claims, 5 Drawing Figures 3,818,968

APPARATUS FOR USE IN MOUNTING TIRES ON AND REMOVING TIRES FROM WHEEL RIMS

This invention relates to apparatus for use in mounting tires on and removing tires from wheel rims.

In accordance with the invention apparatus for use in mounting tires on and removing tires from wheel rims comprises a wheel supporting means comprising a drivably rotatable first plate, a rotatable second plate arranged co-axially with said first plate, a wheel rim gripping means comprising at least three arms each pivotally mounted at one end on one of said plates, the arms being in circumferentially-spaced-apart relationship and each being slidably and pivotally mounted on the other of said plates at a position intermediate its ends, braking means continuously engaging the second plate to apply a substantially radial force thereto, and means for drivably rotating the first plate to cause relative rotation between the first and second plates whereby the arms are caused to pivot about their pivotally mounted ends such that their free ends remote from said pivotally mounted ends move either inwards or outwards, depending on the direction of relative rotation, to become respectively engaged with or disengaged from a wheel rim.

The substantially radial force may be applied substantially radially inwards or outwards with respect to the rotational axes of the two plates. The braking means may comprise a plurality of resiliently mounted pads of friction material, e.g., brake lining material, each supported separately in engagement with a collar integrally forced with or attached to the second plate. The pads are preferably demountable e.g., for replacement or repair, and adjustable.

Two embodiments of the invention will now be described by way of example only with reference to the accompanying drawings of which:

Figure 1:
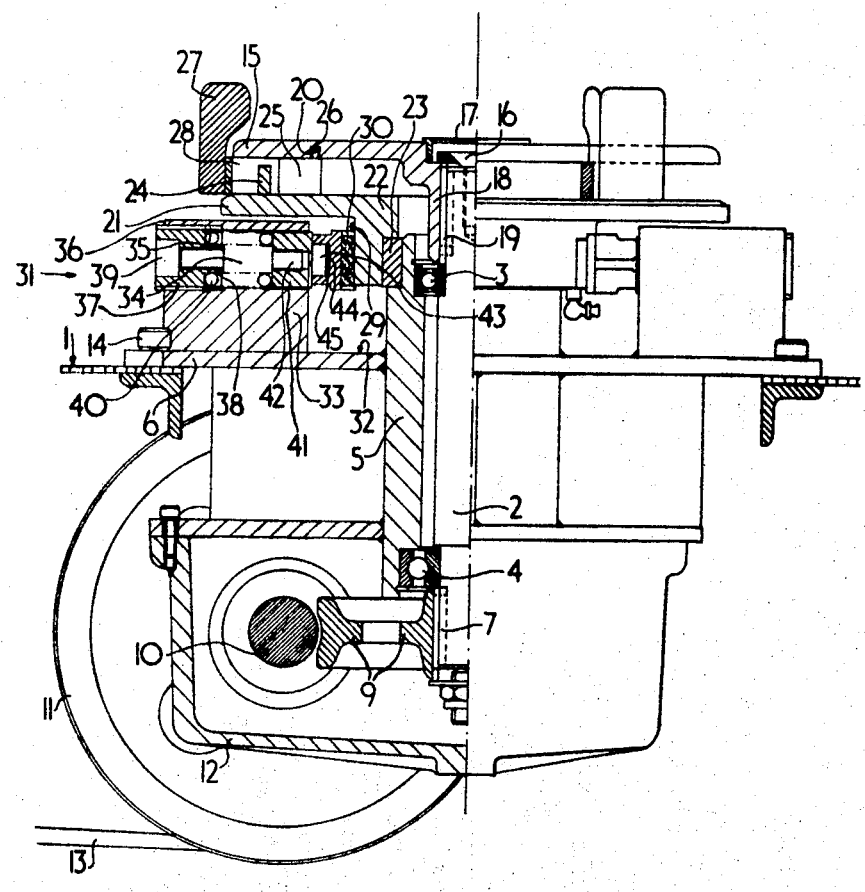
FIG. 1 shows a half cross-section half-side view of the supporting means of the apparatus of the first embodiment.

Each embodiment of the apparatus for mounting a tire on and removing a tire from a wheel rim comprises a housing enclosing a reversible electric motor drivably connected to a rotatable wheel supporting means located on a horizontal working surface of the housing. A vertical stand extends upwards from the surface and supports an arm to which is attached the tire engaging tool which effects the tire mounting or removal on to or from a wheel rim supported on the rotatable wheel supporting means. The arms may be slidably or pivotally attached to the stand about a vertical or horizontal axis, so that the tool may be readily moved between a parked position and the operative position when it is in engagement with the tire. The tool may be as disclosed in British Pat. No. 1,215,805.

The wheel supporting means of each embodiment comprises a single unit supported on the working surface of the housing. Each comprises a vertical driving shaft 2 mounted on bearings 3, 4 co-axially within a hollow shaft 5 to which is welded at a position intermediate its ends a flat horizontal cover plate 6. This plate covers a hole formed in the working surface 1 of the housing and is bolted to the surface at the edge of the hole. At the base 7 of the driving shaft is secured a gear wheel 9 which meshes with a horizontal worm 10 on a shaft carrying a pulley 11.

The gear wheel 9 and worm 10 are enclosed within a sump 12 secured to the lower end of the hollow shaft 5 but the pulley 11 is external to the sump 12. A V-belt 13 engages with the pulley 11 attached to the worm shaft and with a second pulley attached to the motor to cause the vertical shaft to be rotatably driven through the worm 10 and gear wheel 9 when the motor is running.

By undoing the bolts 14 connecting the cover plate 6 to the housing and disengaging the V-belt 13 from the pulleys the supporting means may be readily separated from the housing for servicing and/or repair.

The wheel supporting means of the first embodiment comprises a horizontal upper circular plate 15 bolted to the top of the driving shaft 2 by means of a recessed bolt 16, the head of which is below the level of the top surface of the upper plate. A dust cap 17 is fitted over the bolt head in the recess. An annular boss 18 is integrally formed with the underside of the upper plate 15 and located externally of the upper end of the shaft 2. A key 19 located in keyways one on the exterior of the shaft and the other on the interior of the boss prevents relative rotation of the shafts and plate.

On the underside of the upper plate radially outwards of the boss are formed three circumferentially-spaced-apart blind holes 20, each the same distance from the axis of the shaft.

A lower circular plate 21 having a diameter slightly greater than that of the upper plate 15 is mounted on the upper end of the hollow shaft 5 in co-axial spaced-apart relationship with the upper plate on the upper end of the hollow shaft. The underside of this lower plate is integrally formed with an annular collar 22 of internal diameter larger than the end of the hollow shaft and a phosphor-bronze sleeve 23 is provided between the hollow shaft and collar allows free rotation of the lower plate about the hollow shaft. Alternatively, the sleeve could be of nylon or other low friction, hard wearing material.

The lower plate is provided on its upper surface adjacent its radially outer edge with three circumferentially equally spaced-apart upstanding lugs 24 and provides support for three horizontal wheel rim gripping arms 25 which are located between the upper and lower plates.

Each arm is inclined at an angle with respect to the radial direction relative to the shaft and is provided at its radially inner end with an upstanding lug 26 for engagement in one of the three blind holes 20 formed in the underside of the upper plate 15. At its radially outer end each arm extends beyond the peripheries of the upper and lower plate and is formed with an upwardly extending wheel rim gripping claw 27 for engaging with the lower rim flange of a wheel disposed with its axis vertical on the wheel supporting means. Intermediate their ends each arm is provided with an elongated slot 28 which engages with one of the three upstanding lugs 24 on the lower plate 21. Relative rotation of the upper and lower plates causes the arms 25 to pivot about the lugs 26 adjacent their radially inner ends and pivot and slide relative to the lugs 24 on the lower plate to cause the claws 27 to move arcuately inwards or outwards into or out of engagement with the wheel rim depending on the direction of relative rotation between the upper and lower plates.

The radially outer surface 29 of the annular collar 22 formed on the underside of the lower plate 21 is continuously engaged by two diametrically opposed concave friction pads 30 which are pressed radially inwards with respect to the shaft 2 on the radially outer surface 29 of the collar 22. A braking force is thus applied continuously to the lower plate.

Each friction pad 30 forms part of a braking unit 31 located on the upper surface 32 of the cover plate 6 of the supporting means in such a position that each pad 30 may be readily removed for cleaning, etc. and individually adjusted.

The braking unit 31 comprises a block 33 welded to the upper surface 32 of the cover plate 6 and having a bore 34 extending therethrough in a radial direction with respect to the driving shaft 2. The axis of the bore is horizontal and its height above the upper surface of the cover plate coincides with a level intermediate the underside of the lower plate and the lowest extremity of the collar integrally formed with the lower plate. A portion 35 of the bore 34 adjacent the outer extremity 36 of the bore is threaded for the reception of a threaded plug 37 having on its inner end a small spigot 38 and on its outer end a recessed hexagon-shaped hole 39 by means of which it may be screwed into the bore. A helical spring 40 having an outer diameter slightly less than that of the bore seats against the end of the plug 37 nearer the shaft 2, the spigot 38, which has a diameter slightly less than the internal diameter of the spring, seating within it.

The end of the spring nearer the shaft bears against a cylindrical plug 41 which is capable of sliding in the bore. This plug is formed with a threaded recess on its end further from the shaft and with a spigot 43 on its end nearer the shaft. The spigot 43 acts as a locating element for a backing plate 44 on which the friction pad 30 is mounted so that the spring forces the pad into engagement with the radially outer surface of the collar 22 formed on the under surface of the lower plate. The backing plate has a recess 45 on its outer surface for reception of the spigot on the cylindrical plug and has a curved radially inner surface to which the curved friction pad is bonded. The whole length of the backing plate is covered by the pad and is such that the pad engages an arc of the collar which subtends an angle of approximately 60° at the shaft axis.

In use of the first embodiment of the apparatus a wheel rim on to which a tire is to be mounted is placed on the upper plate 15 of the wheel supporting means. The motor is driven to rotate the shaft 2 in the direction in which the radially inner end of each arm 25 is leading with respect to the remainder of the arm. During the first part of the rotation the lower plate 21 remains stationary on account of the braking action of the two friction pads 30 each arm being caused to slide and pivot about its respective upstanding lug 24 on the lower plate and pivot about the lug provided at its radially inner end to move the end of the arm carrying the claw 27 inwardly towards the wheel rim. This action continues until the claw engages with the rim of the wheel, and when all three claws are engaged and the arms can no longer slide with respect to the lower plate the upper and lower plate are effectively locked together. The continuing rotational force of the motor then overcomes the braking force of the pads on the lower plate and this plate and therefore the arms and the wheel rotate. The frictional force applied by the pads is such that a considerable clamping force is exerted on the wheel rim and the wheel continues to rotate while a tire is being mounted on the rim e.g., in a manner as disclosed in the aforementioned British Pat. No. 1,215,805, this mounting clearly causing a drag force to be applied to the wheel.

To remove a tire from a wheel the action of the supporting means in clamping the wheel while the tool acts upon the tire is exactly similar to that just described.

To unclamp a wheel from the apparatus the motor is reversed, and the claws are thus caused to move outwards allowing the wheel and tire, if a mounting operation has been carried out, to be lifted from the apparatus.

An advantage of the supporting means just described is that the claws when engaging the wheel rim have a self-centering action so there is no need to provide a hub for the wheel. A further advantage is that the friction pads are separately removable and adjustable without removing the upper plate. They are also self-cleaning since any dirt or grease will tend to drop down on to the cover plate.

To remove a pad 30 the hexagon key is inserted in the hexagon-shaped recess 39 in the threaded plug 38 and this is unscrewed from the bore 34. A screw is engaged in the threaded recess 42 on the side of the slidable cylindrical plug 41 further from the shaft and used to slide the plug radially outwards with respect to the shaft while the pad and backing plate 44 are held. This disengages the spigot 43 on the surface of the plug nearer the shaft from the recess 45 in the backing plate so that the backing plate 44 and pad 30 may be lowered on to the cover plate 6 and then moved out from under the collar 22 on the lower plate. A replacement pad already bonded to its backing plate may then be fitted by reversing the above sequence of steps. The force applied to the pad by the helical spring 40 is adjusted by adjusting the position of the screw threaded plug 37 in the bore.

Figure 2:
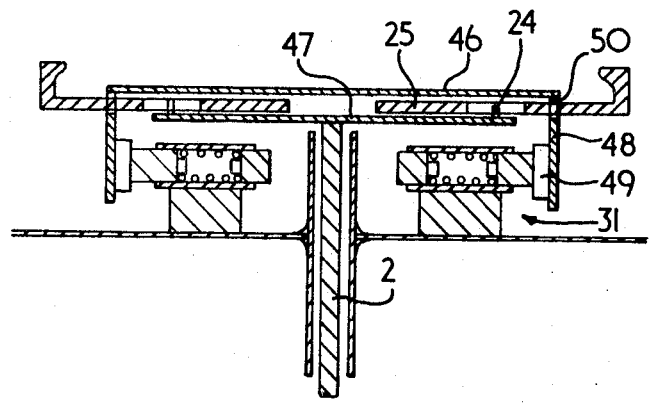
FIG. 2 shows a cross-section through the supporting means of the apparatus of the second embodiment.
Figure 3:
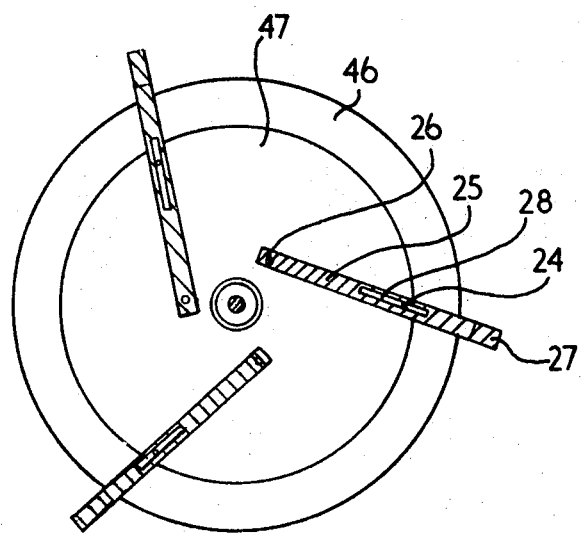
FIG. 3 shows a diagrammatic plan view of the apparatus of the second embodiment parts being omitted for clarity.

The second embodiment of the invention, illustrated in FIGS. 2 and 3 by diagrammatic drawings, is similar to the first embodiment except that the upper plate 46 is of larger diameter than the lower plate 47 and is braked, while the lower plate is connected directly to the driving shaft 2 and is therefore rotatably driven.

The upper plate 46 is formed at its outer periphery with an annular collar 48 which extends downwards to below the level of the lower plate 47 to be engaged by friction pads 49 on its radially inner surface. The curvature of the pads is convex rather than concave as in the first embodiment. Three slots 50 are formed in the collar through which the three arms 25 protrude.

The action of this second embodiment is analogous to the first but to remove the friction pad the upper plate has first to be lifted from the apparatus taking the arms with it, thereby revealing the pads 49 on the braking units 31 beneath.

It is to be noted that FIG. 2 is not a true cross-section since there are two braking units 31 arranged diametrically with respect to the shaft 2 and there are three arms 25 each inclined at an angle with respect to the radial direction relative to the shaft 2 as shown in FIG.

3. The general arrangement of the arms illustrated in FIG. 3 is the same as in the first embodiment.

In some instances where the wheel to be held on the supporting means has a hub or part of its central disc which extends through or close to the plane defined by an axially outer extremity of a rim flange, difficulty may be encountered in use of the machine since the upper plate 15 or dust cap 17 may contact said hub or part of the central disc of the wheel and prevent the rim from being gripped correctly by the claws 27 on the arms 25.

Figure 4:
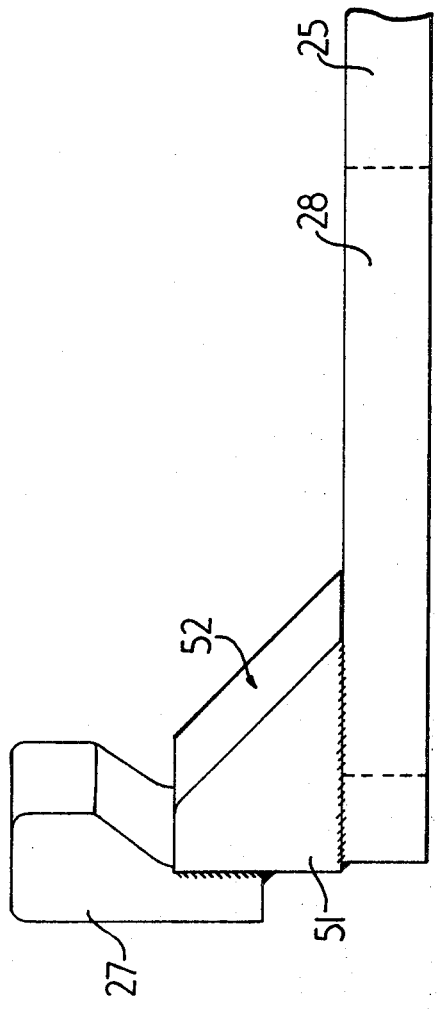
FIGS. 4 and 5 shows a perspective and plan view of a modification which may be made to the arms and claws of either embodiment.
Figure 5:
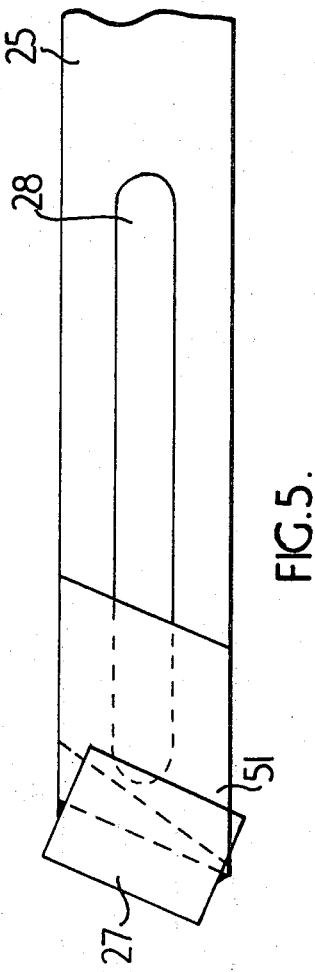

In order to overcome this the arms may be modified as shown in FIG. 4 and 5, by inclusion of a wedge shaped block 51 welded between the outer end of each arm 25 and the claw 27, thus providing a ramp surface 52 up which a wheel rim flange will ride on operation of the mechanism to cause relative rotation of the upper plate 15 and lower plate 21. The hub and central disc of the wheel will thus be raised clear of the upper plate 15 of the apparatus. The claw, arm, and wedge shaped block can be produced as a casting in which case there are no separate parts the complete assembly being cast as one unit.

Having now described my invention what I claim is:

1. Apparatus for use in mounting tires on and removing tires from wheel rims comprising a base member and a wheel supporting member comprising a drivably rotatable first plate, a rotatable second plate arranged coaxially with said first plate, an annular collar extending in an axial direction from said second plate and having a cylindrical surface thereon, a wheel rim gripping means comprising at least three arms each having one of its ends pivotally mounted to one of said plates, the arms being in circumferentially spaced apart relationship and each being slidably and pivotally mounted on the other of said plates at a position intermediate its ends, braking means mounted on said base member and continuously engaging said cylindrical surface of the second plate to apply a substantially radial force thereto, and means for drivably rotating the first plate to cause relative rotation between the first and second plates whereby the arms are caused to pivot about their pivotally mounted ends such that their free ends remote from said pivotally mounted ends move either inwards or outwards, depending on the direction of relative rotation, to become respectively engaged with or disengaged from a wheel rim.

2. Apparatus according to claim 1 wherein the braking means comprises a plurality of pads of friction material and resilient means on which the pads are each supported separately for engagement with the cylindrical surface of said collar, the pads thus applying a substantially radial force to the collar.

3. Apparatus according to claim 2 wherein the pads are demountable.

4. Apparatus according to claim 1 wherein said cylindrical surface is formed on the interior of said collar and the braking means applies a substantially radially outward force thereto.

5. Apparatus according to claim 1 wherein the cylindrical surface is formed on the exterior of said collar and the braking means applies a substantially radially inwards force thereto.

* * * * *